(12) United States Patent
Couleur et al.

(10) Patent No.: US 10,063,145 B1
(45) Date of Patent: Aug. 28, 2018

(54) ON-TIME MODULATION FOR PHASE LOCKING IN A BUCK CONVERTER USING COUPLED INDUCTORS

(71) Applicant: Apple Inc., Cupertino, CA (US)

(72) Inventors: Michael Couleur, Egern (DE); Fabio Ongaro, Munich (DE); Dashun Xue, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/444,594

(22) Filed: Feb. 28, 2017

(51) Int. Cl.
*G05F 1/00* (2006.01)
*H02M 3/158* (2006.01)

(52) U.S. Cl.
CPC .................. *H02M 3/158* (2013.01)

(58) Field of Classification Search
CPC ....... H02M 2003/1586; H02M 3/1588; H02M 3/156; H02M 3/158
USPC ................. 323/271, 272, 282, 288
See application file for complete search history.

(56) References Cited

U.S. PATENT DOCUMENTS

| | | | |
|---|---|---|---|
| 6,023,154 A * | 2/2000 | Martinez | H02M 3/1584 323/272 |
| 7,233,132 B1 | 6/2007 | Dong | |
| 8,044,650 B2 | 10/2011 | Tang | |
| 8,716,991 B1 * | 5/2014 | Ikriannikov | H01F 27/2804 323/272 |
| 9,397,567 B2 | 7/2016 | Searles | |
| 2003/0218893 A1 * | 11/2003 | Tai | H02M 3/1584 363/65 |
| 2004/0233690 A1 * | 11/2004 | Ledenev | H02M 3/1584 363/133 |
| 2007/0001658 A1 * | 1/2007 | Nguyen | G06F 1/26 323/290 |
| 2009/0066307 A1 * | 3/2009 | Osterhout | H02M 3/1584 323/283 |
| 2012/0319478 A1 * | 12/2012 | Gentchev | H02M 1/14 307/28 |
| 2014/0002038 A1 * | 1/2014 | Hsu | H02M 3/1584 323/271 |
| 2015/0381040 A1 | 12/2015 | Uan-Zo-Li | |
| 2016/0079851 A1 | 3/2016 | Babazadeh | |
| 2016/0233766 A1 | 8/2016 | Todorov | |
| 2016/0254747 A1 * | 9/2016 | Hirukawa | H02M 3/1584 323/271 |

* cited by examiner

*Primary Examiner* — Alex Torres-Rivera
(74) *Attorney, Agent, or Firm* — Meyertons, Hood, Kivlin, Kowert & Goetzel, P.C.

(57) ABSTRACT

A regulator circuit that employs coupled inductors with on-time modulation is disclosed. The regulator circuit includes a driver circuit coupled via first and second inductors to a power supply node of a load circuit, and may charge the power supply node via the first inductor for a first charging period, and charge the power supply node via the second inductor for a second charging period. A control circuit may determine durations of the first and second charging periods using respective pluralities of currents.

17 Claims, 9 Drawing Sheets

ON-TIME MODULATION FOR PHASE LOCKING IN A BUCK CONVERTER USING COUPLED INDUCTORS

BACKGROUND

Technical Field

Embodiments described herein relate to integrated circuits, and more particularly, to techniques for generating regulated power supply voltages.

Description of the Related Art

A variety of electronic devices are now in daily use with consumers. Particularly, mobile devices have become ubiquitous. Mobile devices may include cell phones, personal digital assistants (PDAs), smart phones that combine phone functionality and other computing functionality such as various PDA functionality and/or general application support, tablets, laptops, net tops, smart watches, wearable electronics, etc.

Such mobile devices may include multiple integrated circuits, each performing different tasks. In some cases, circuits that perform different tasks may be integrated into a single integrated circuit forming a system on a chip (SoC). The different functional units within a SoC may operate at different power supply voltage levels. In some designs, power supply or regulator circuits may be included in, or external to, the SoC to generate different voltage levels for the myriad functional units included in the SoC.

Regulator circuits may include one or more reactive circuit components. For example, individual regulator sub-assemblies may employ a combination of inductors or capacitors. The reactive circuit components may be fabricated on an integrated circuit with the regulator circuits, or they may be included as discrete components in a semiconductor package or circuit board.

SUMMARY OF THE EMBODIMENTS

Various embodiments of a system including a regulator circuit and coupled inductors are disclosed. Broadly speaking, a system is contemplated, in which a first and a second inductor are coupled to a power supply node of a load circuit, and the first and second inductor are inductively coupled to each other. A driver circuit coupled to the first and second inductors may be configured to charge the power supply node for a first charging period via the first inductor and charge the power supply node for a second charging period via the second inductor. A control circuit may be configured to determine a duration of the first charging period using a first plurality of currents and determine a second duration of the second charging period using a second plurality of currents.

In one embodiment, the driver circuit may be further configured to discharge the power supply node via the first inductor in response to a determination that the first charging period has ended. The driver circuit may be further configured to discharge the power supply node via the second inductor in response to a determination that the second charging period has ended.

In a further embodiment, to determine the first duration of the first charging period, the control circuit may be further configured to charge a first capacitor using a first current of the first plurality of currents, and charge the first capacitor using a second current of the first plurality of currents, where the second current is based on a coupling coefficient indicative of an amount of coupling between the first and second inductors. The control circuit may be further configured to compare a first voltage level across the first capacitor to a first reference ramp voltage.

BRIEF DESCRIPTION OF THE DRAWINGS

The following detailed description makes reference to the accompanying drawings, which are now briefly described.

Figure 1:
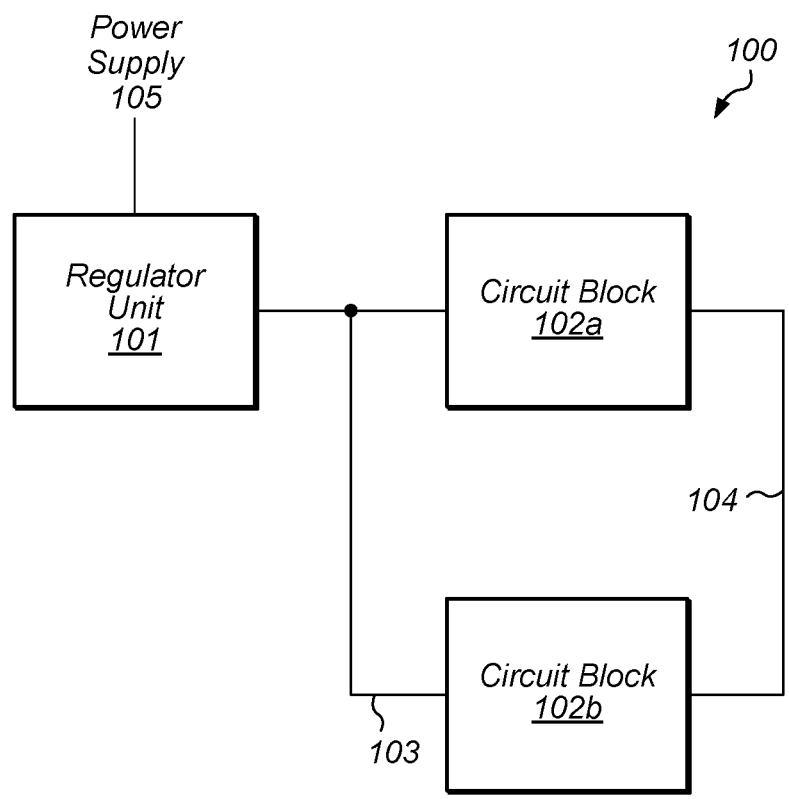
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Computing systems may include multiple functional units or circuit blocks. These circuit blocks may be mounted together in a common integrated circuit package, or circuit board. Some computing systems may include multiple functional units on a single integrated circuit, commonly referred to as a "System-on-a-chip" or "SoC." Each functional unit or circuit block within a computing system, may operate at a different voltage levels, which may be different than a voltage level of a master power supply of the power supply. In order to generate the desired voltage levels, one or more regulator units may be employed.

In some computing systems, DC-DC switching regulators are used to generate the desired voltage levels. Switching regulators rapidly switch a series of transistors on and off in order to transfer charge to a load through an inductor, such as one of the aforementioned functional units or circuit blocks. By adjusting the duration of the time individual transistors are switched on, the voltage level at the load may be kept within a predetermined range of a desired value. In some cases, multiple inductors may be employed, with charged being transferred to the load through each inductor at different times. To improve performance and reduced voltage droop at the load, the inductors may be arranged such that they are inductively coupled to each other, i.e., a change in current flowing through one inductor may induce a change in a magnetic field, which, in turn, induces a current in another inductor.

Some switching regulators employ multiple smaller regulator units operating sequentially to provide the desired voltage level. Such multi-phase regulators often use a current loop used to control the operation of the individual regulator units. Such current control methods are, however, subject to clock latency issues as well as subharmonics in the control loop.

Additionally, response time to changes in load current demand may be limited. In some designs, large capacitors may be employed on the output of the regulator unit to limit voltage droop, which may increase area consumption and cost. The embodiments illustrated in the drawings and described below may provide techniques for achieving faster response time in a regulator circuit, while limiting the impact of clock latency and subharmonics, as well as providing reduced area consumption and cost.

A block diagram of a computing system including multiple circuit blocks or functional units is illustrated in FIG. 1. In the illustrated embodiment, computing system 100 includes Regulator Unit 101, and Circuit Blocks 102a and 102b. Regulator Unit 101 is coupled to power supply 105, and regulated power supply 103. Circuit Blocks 102a and 102b are also coupled to regulated power supply 103. Additionally, Circuit Block 102a is coupled to Circuit Block 102b via communication bus 104.

As described below in more detail, Regulator Unit 101 may, in various embodiments, be configured to generate regulated power supply 103 using power supply 105. A voltage level of regulated power supply 103 may be less than, equal to, or greater than a voltage level of power supply 105 dependent upon the needs of Circuit Blocks 102a and 102b. Although only a single regulated power supply is depicted in the embodiment illustrated in FIG. 1, in other embodiments, multiple regulated power supplies may be employed. In such cases, different circuit blocks may be coupled different regulated power supplies. Alternatively, a single circuit block may be coupled to multiple regulated power supplies.

In the illustrated embodiment, either of Circuit Blocks 102a or 102b may include a processor, processor complex, or a memory. In some embodiments, Circuit Blocks 102a and 102b may include Input/Output (I/O) circuits or analog/mixed-signal circuits. In various embodiments, computing 100 may be configured for use in a desktop computer, server, or in a mobile computing application such as, e.g., a tablet or laptop computer. It is noted that although FIG. 1 illustrates only two circuit blocks, in other embodiments, any suitable number of circuit blocks may be employed. Additional communication busses may also be employed to connect the various circuit blocks.

As used and described herein, a processor or processor complex having one or more processors or processor cores may, in various embodiments, be representative of a general-purpose processor that performs computational operations. For example, a processor may be a central processing unit (CPU) such as a microprocessor, a microcontroller, an application-specific integrated circuit (ASIC), or a field-programmable gate array (FPGA).

In the present disclosure, a memory describes any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example.

Analog/mixed-signal circuits may include a variety of circuits including, for example, a crystal oscillator, a phase-locked loop (PLL), an analog-to-digital converter (ADC), and a digital-to-analog converter (DAC) (all not shown). In other embodiments, analog/mixed-signal circuits included in one of Circuit Blocks 102a or 102b may include, radio frequency (RF) circuits that may be configured for operation with wireless networks.

As used herein, I/O circuits may be configured to coordinate data transfer between computing system 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O circuits may be configured to implement a version of Universal Serial Bus (USB) protocol, IEEE 1394 (Firewire®) protocol, or an Ethernet (IEEE 802.3) networking standard such as Gigabit Ethernet or 10-Gigabit Ethernet.

In some embodiments, each of the aforementioned circuit blocks may include multiple circuits, each of which may include multiple devices, such as, e.g., metal-oxide semiconductor field-effect transistors (MOSFETs) connected via multiple wires fabricated on multiple conductive layers. The conductive layers may be interspersed with insulating layers, such as, silicon dioxide, for example. Each circuit may also contain wiring, fabricated on the conductive layers, designated for a power supply net or a ground supply net.

Each of Regulator Unit 101, and Circuit Blocks 102a and 102b may, in various embodiments, be fabricated on a silicon wafer (or simply "wafer") along with numerous identical copies of Regulator Unit 101 and Circuit Blocks 102a and 102b, each of which may be referred to as a "chip" or "die." During manufacture, various manufacturing steps may be performed on each chip in parallel. Once the manufacturing process has been completed, the individual chips may be removed from the wafer by cutting or slicing through unused areas between each chip.

In other embodiments, Regulator Unit 101 may be fabricated on a separate chip than Circuit Blocks 102a and 102b. In such cases, Regulator Unit 101 and Circuit Blocks 102a and 102b may be coupled together inside a semiconductor package. Alternatively, Regulator Unit 101 and Circuit Blocks 102a and 102b may be mounted on a common circuit board or other suitable substrate. In such cases, wiring for regulated power supply 103 and communication bus 104 may include multiple metal layers fabricated into the package or circuit board.

Figure 2:
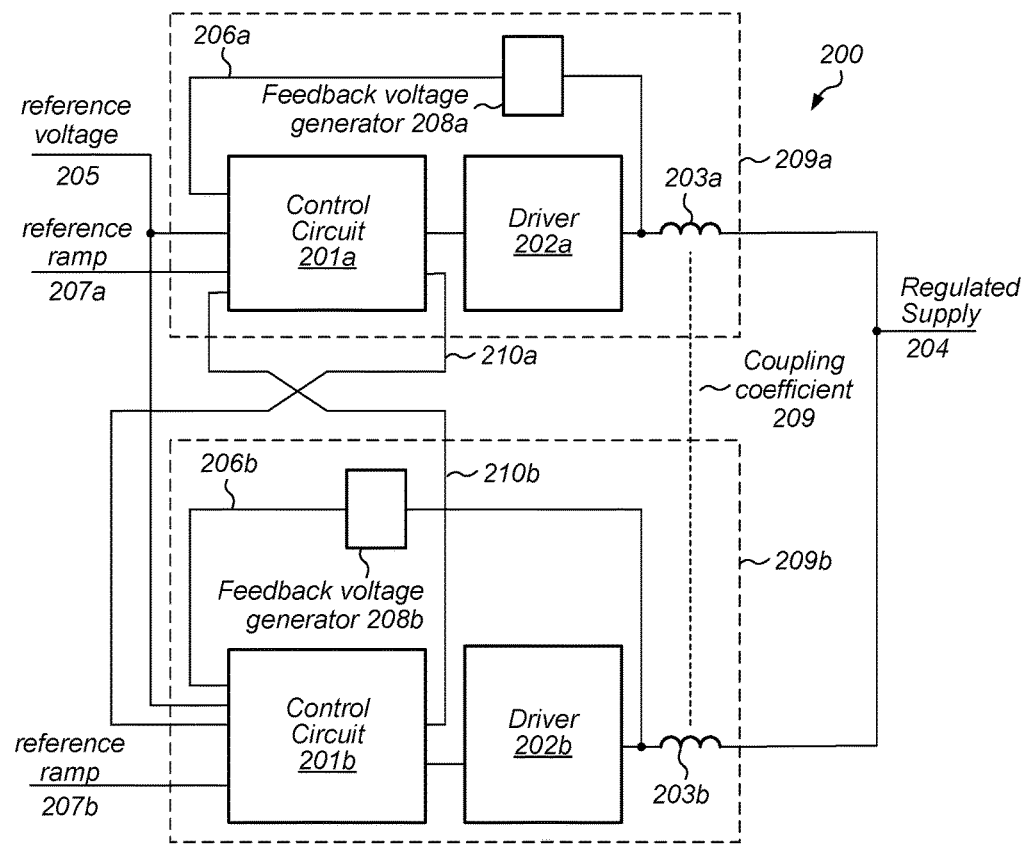
FIG. 2 illustrates an embodiment of a regulator unit using coupled inductors.

An embodiment of a regulator unit is depicted in FIG. 2. In various embodiments, regulator unit 200 may correspond to regulator unit 101 as illustrated in FIG. 1. In the illustrated embodiment, regulator unit 200 includes phase units 209a and 209b. Each of phase units 209a-b is coupled to regulated supply 204. In various embodiments, regulated supply 204 may correspond to regulated power supply 103 as depicted in FIG. 1.

Phase unit 209a includes control circuit 201a, driver 202a, feedback voltage generator 208a, and inductor 203a. In a similar fashion, phase unit 209b includes control circuit 201b, driver 202b, feedback voltage generator 208b, and inductor 203b. Inductors 203a and 203b may be inductively coupled to each other (commonly referred to as "coupled inductor"). Coupling coefficient 209 may specify the magnitude of the coupling between inductor 203a and 203b. As used and described herein, a coupling coefficient is a value indicative of an amount of inductive coupling between two inductors. It is noted that although FIG. 2 only depicts two coupled inductors, in other embodiments, any suitable number of coupled inductors with various amounts of coupling between them may be employed.

Each of feedback voltage generators 208a-b may be configured to generate feedback voltages 206a-b, respectively, based on output voltages of drivers 202a-b, respectively. In various embodiments, feedback voltage generators 208a-b may include any suitable combination of resistors and capacitors to generator the corresponding feedback voltage that tracks variations in at the output of the respective driver circuits.

As described below in more detail, control circuits 201a-b may be configured to determine respective charging periods for each of phase units 209a-b, based on feedback voltages 206a-b, reference voltage 205, control signals 210a-b, and reference ramps 207a-b. In various embodiments, each of control circuits 201a-b may compare a respective one feedback voltages 206a-b to voltage reference 205, and based on the comparison initiate a respective charging period. The operation of each of phase unit 209a-bmay, in various embodiments, may be controlled by the frequency of a respective one of reference ramp 207a-b.

Each of drivers 202a-b may include multiple devices configured to allow current to be sourced or sunk from regulated supply 204 based on control signals received from control circuits 201a-b. Inductors 203a-b may, in some embodiments, be located on a semiconductor chip or die separate from control circuits 201a-b and drivers 202a-b. Alternatively, inductors 203a-b may be co-located with control circuits 201a-b and drivers 202a-b.

It is noted that the embodiment illustrated in FIG. 2 is merely an example. In other embodiments, different numbers of phase units may be employed.

Figure 3:
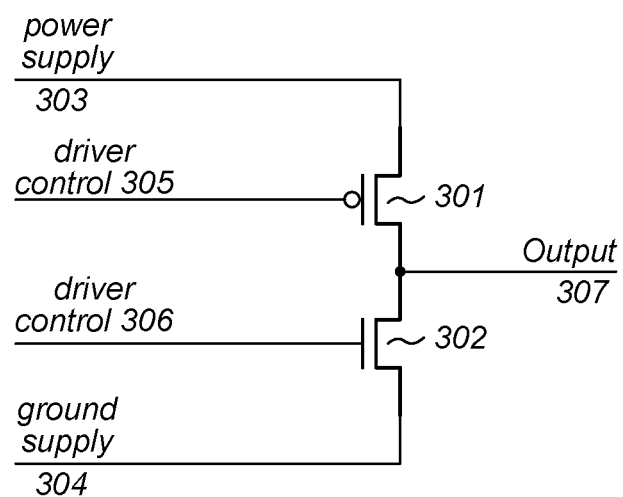
FIG. 3 illustrates an embodiment of a driver circuit.

An embodiment of driver circuit, such as, driver 202a as illustrated in FIG. 2, is depicted in FIG. 3. In various embodiments, the embodiment depicted in FIG. 3 may correspond to any of drivers 202a-b as depicted in FIG. 2. In the illustrated embodiment, driver 300 includes device 301 and device 302.

Device 301 is coupled between power supply 303 and output 307, and is controlled by driver control 305. In various embodiments, output 307 may be coupled to a regulated power supply node, such as, e.g., regulated supply 204, via an inductor. Power supply 303 may, in some embodiments, correspond to a power supply whose voltage level is either too high to too low for the operation of a particular circuit block. Device 302 is coupled to output 307 and ground supply 304, and is controlled by driver control 306.

Each of devices 301 and 302 may, in various embodiments, correspond to a metal-oxide semiconductor field-effect transistor (MOSFET) or any other suitable transconductance device. In particular, device 301 may correspond to a p-channel MOSFET, and device 302 may correspond to an n-channel MOSFET. Although a single device is illustrated for each of devices 301 and 302, in other embodiments, multiple devices may be used in parallel to form either of devices 301 and 302.

During operation, in response to a low logic level on driver control 305, device 301 may be enabled allowing current to flow from power supply 303 to output 307. In various embodiments, a value of the current flowing through device 301 while it is enabled may be proportional to a physical size of device 301. Additionally, a high logic level on driver control 306 may enable device 302, resulting in a current flow from output 307 into group supply 304. In various embodiments, to prevent a flow of current from power supply 303 to ground supply 304, driver control 305 and 306 are generated to prevent both devices 301 and 302 from being enabled at the same time.

As used and described herein, a low logic level (or a "logic 0 value") corresponds to a voltage level sufficiently low to enable a p-channel MOSFET, and a high logic level (or a "logic 1 value") corresponds to a voltage level sufficiently high to enable an n-channel MOSFET. In other embodiments, any suitable voltage levels may be employed for low and high logic levels based on a type of devices being used in driver 300.

It is noted that the embodiment illustrated in FIG. 3 is merely an example. In other embodiments, different numbers of devices, and different arrangements of devices may be employed.

Figure 4:
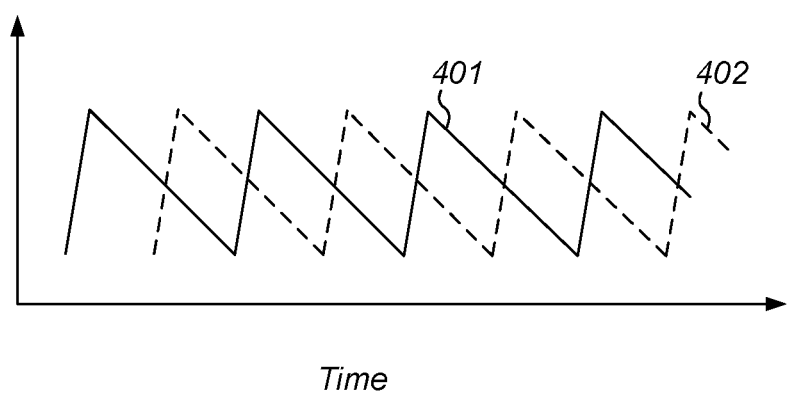
FIG. 4 illustrates sample waveforms reference ramp signals used in a regulator unit that employs coupled inductors.

To help determine the duration of the charging period of a particular phase of a regulation unit, a reference voltage ramp (or simply "reference ramp") with a desired frequency may be employed. Examples of such voltage ramps are illustrated in the diagram of FIG. 4. In various embodiments, waveforms 401 through 403 may correspond to reference ramps 207a and 207b as illustrated in FIG. 2.

In the illustrated embodiment, each of reference ramps 401 and 402 are substantially the same, although separated by in time. In some embodiments, each of reference ramps 401 and 402 are separated by a 180-degree phase shift. In other embodiments, where additional inductors are employed, additional reference ramp signals, with appropriate phase shifts, may be used along with corresponding phase units.

Each of reference ramps 401 and 402 includes two regions. In one region, the voltage level of the reference ramp signal is increasing, while in the other region, the voltage level of the reference ramp is decreasing. The slopes of these two regions may be determined based on a desired level of performance for the regulation unit. In some cases, a capacitor being charged and discharge with respective bias currents, or any other suitable circuit, may be used to generate the increasing and decreasing voltage level regions of the reference ramp signals.

The waveforms illustrated in FIG. 4 are merely examples. In other embodiments, different time periods may be used for the increasing and decreasing voltage levels of the reference ramp.

Figure 5:
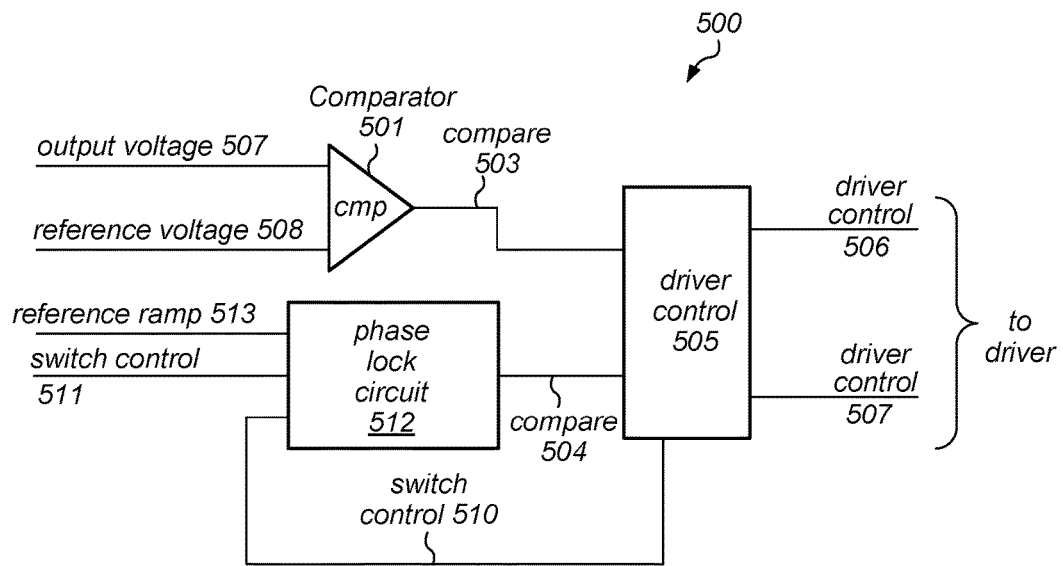
FIG. 5 illustrates an embodiment of a control circuit of a regulator unit.

Turning to FIG. 5, an embodiment of a control circuit used in a regulation unit is illustrated. Control circuit 500 may, in various embodiments, correspond to any of control circuits 201a-b as depicted in FIG. 2. In the illustrated embodiment, control circuit 500 includes comparator 501, driver control 505, and phase lock circuit 512.

Comparator 501 may be configured to compare output voltage 507 to reference voltage 508. In various embodiments, output voltage 507 may correspond to an output voltage of a driver circuit, such as, driver circuit 202a, for example. In some cases, output voltage 507 may generated using a feedback voltage generator, such as, e.g., feedback voltage generator 208a, which may be configured to generate a feedback voltage based on a current flowing through inductor 203a. Comparator 501 may include an operational amplifier (op-amp) or any other suitable type of differential amplifier.

During operation, comparator 501 may assert compare 503 in response to a determination that a voltage level of output voltage 507 is less than a voltage level of reference voltage 508. It is noted that the voltage level of reference voltage 508 may correspond to a desired voltage level for the output of the regulation unit.

Driver control 505 may be configured to generate driver control 506 and driver control 507, as well as switch control 510, based on compare 503. In some cases, the assertion of compare 503 may cause driver control 505 to adjust voltage levels of driver control 506 and 507 such that appropriate devices are activated in a driver circuit, such as, e.g., driver 202a, to allow current to be source, via an inductor, to the output of the regulator unit. In various embodiments, signals 511 and 512 may operate in a similar fashion to driver control 506 and 507, respectively.

In various embodiments, driver control 505 may include a flip-flop circuit, or any other suitable circuit, configured to enter a particular state in response to an assertion of compare 503, and enter another, different state, in response to an assertion of compare 504.

As described below in more detail, phase lock circuit 512 may be configured to determine a duration of a charging period, once driver control 505 has transitioned driver control 506 and 507 to values that allow current to flow to the output of the regulator unit. In various embodiments, the charging period may be phase locked to a frequency of reference ramp 513. When the end of the charging period has been determined, phase lock circuit 512 may assert compare 504. It is noted that reference ramp 513 may correspond to any of reference ramps 207a-b, as illustrated in FIG. 2.

As mentioned above, in response to the assertion of compare 504, driver control 505 may change the values of driver control 506 and 507, as well as switch control 510. The updated values of driver control 506 and 507 may enable different devices in a driver circuit such that no further current is applied to the output of the regulator unit, and instead, current is sunk from the output of the regulator unit.

It is noted that the embodiment of a control circuit illustrated in FIG. 5 is merely an example. In other embodiments, different circuit blocks and different arrangements of circuit blocks are possible and contemplated.

Figure 6:
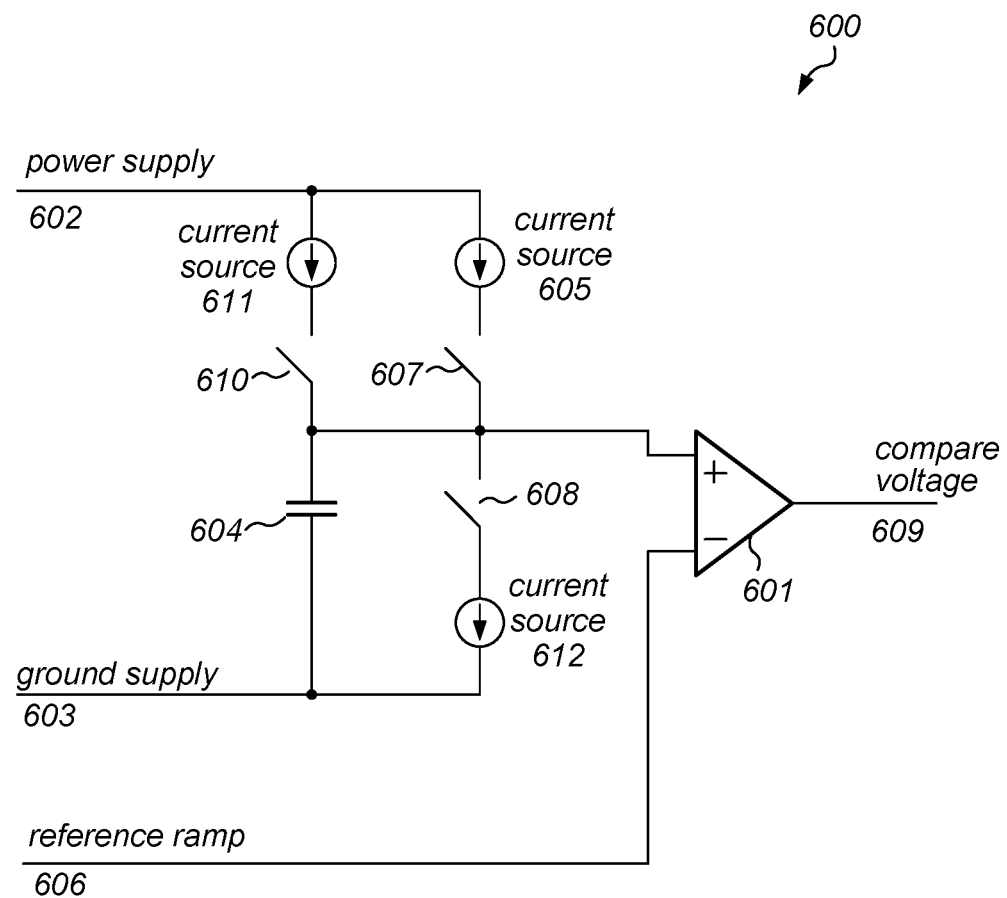
FIG. 6 illustrates an embodiment of a phase lock circuit for use in a regulator unit that employs coupled inductors.

As mentioned above, the charging and discharging of the output of a regulator unit may be phase locked to a particular frequency. This may be accomplished by detecting an end point for the charging period (also referred to as the "on time") of a particular phase of the regulator unit. An embodiment of a phase lock circuit is illustrated in FIG. 6.

Phase lock circuit 600 may, in various embodiments, correspond to phase lock circuit 512 as illustrated in FIG. 5. In the illustrated embodiment, phase lock circuit 600 includes comparator 601, current sources 605, 611, and 612, switches 607, 608, and 610, and sense capacitor 604.

Comparator 601 may be configured to compare a voltage level across sense capacitor 604 to reference ramp 606 to generate compare voltage 609. In various embodiments, reference ramp 606 may correspond to any of reference ramps 207a-b as illustrated in FIG. 2, and compare voltage 609 may correspond to compare 504 as illustrated in FIG. 5. Comparator 601 may, in some embodiments, include an op-amp, or any other suitable differential amplifier.

Current source 611 is coupled to power supply 602, and may be configured to generate a current that mimics the current flowing through an inductor included in the regulation unit during a charging period. In various embodiments, a value of the current generated by current source may be represented by Equation 1, where $I_{bias1}$ is the current source by current source 605, $V_{in}$ is the voltage level of the power supply coupled to the regulator, $V_{out}$ is the value of a feedback voltage, such as, e.g., feedback voltage 206a, and R is a value of a resistor used to appropriate scale $V_{out}$.

$$I_{bias1} = \frac{V_{in} - V_{out}}{R} \quad (1)$$

In a similar fashion, current source 605 may be configured to generate another bias current used to charge sense capacitor 604. In various embodiments, the charging of sense capacitor 604 using the current generated by current source 605 may be at a different time than the charging using the current generated by current source 611. In various embodiments, the current generated by current source 611 may be represented by Equation 2, wherein $I_{bias2}$ is the current generated by current source 611, and k is the coupling coefficient between the coupled inductors employed by the regulator, and $V_{in}$ and $V_{out}$ are as described above.

$$I_{bias2} = \frac{(V_{in} - V_{out})k}{R} \quad (2)$$

Current source 612 is coupled to ground supply 603, and may be configured to generate a current used to discharge sense capacitor 604. In various embodiments, the discharging of sense capacitor 604 using the current generated by current source 612 may occur on an opposite phase of a control signal used to control switch 607 to allow current source 605 to source current to sense capacitor 604. The current generated by current source 612 may, in some embodiments, be described by Equation 3, where Ibias3 is the current generated by current source 612, and k and $V_{out}$ are as described above.

$$I_{bias3} = \frac{V_{out}k}{R} \quad (3)$$

Each of current sources 605, 611, and 612 may include, in various embodiments, include a supply and/or temperature independent biasing scheme, as well as any suitable number of current mirror circuits.

Switches 607, 608, and 610 may include any suitable combination of p-channel and n-channel MOSFETs, and be controlled by signals 210*a-b* as illustrated in FIG. 2. During operation, switch 610 may be closed, while switches 607 and 608 are open, allowing charging of sense capacitor 604 by current source 611. At a later time, switch 607 may be closed, allowing current source 605 to also source current to sense capacitor 604. As the voltage at the output of the phase unit increase, switch 610 may open and switch 608 may close allowing the current source 612 to sink current from sense capacitor 604. In some embodiments, switch 607 and 608 may operate on opposite phases of the same switch control signals, such as, switch control 510, for example.

It is noted that, in the above description, the operation of the switches may be for a particular phase unit. For example, switch 610 may be operated by switch control 510, while switches 607 and 608 may be operated by switch control 511, which is generated in a different phase unit. In the other phase unit included in regulator unit 200, the roles of switch control 510 and 511 may be reversed.

Sense capacitor 604 may be fabricated using any suitable semiconductor manufacturing process, such as, metal-oxide-metal (MOM), for example. In various embodiments, any suitable value of sense capacitor 604 may be selected to allow for the voltage regulator to phase lock at the frequency of reference ramp 606.

During operation, as the voltage across sense capacitor 604 increases, in response to being charged by current source 605, reference ramp 606 increases to its maximum voltage level and then begins to decrease in voltage level over a period of time. Comparator 601 may be configured to compare the voltage across sense capacitor 604 to that of reference ramp 606. When the voltage level across sense capacitor 604 is greater than that of reference ramp 606, comparator 601 may assert compare voltage 609, which may correspond to compare 504 as illustrated in FIG. 5.

The assertion of compare voltage 609 may, in various embodiments, correspond to the end of the charging period. When the end of the charging period is reached, driver control 505 may change the state of signals 511 and 510. In response to the change in state of switch control 510, switch 610 may open preventing further current from current source 611 from charging sense capacitor 604. At a later time, switch 608 may close, allowing charge stored in sense capacitor 604 to current source 612 to sink current from sense capacitor 604, thereby decreasing the voltage across sense capacitor 604. The voltage across sense capacitor 604 may continue to decrease until it becomes equipotential with ground supply 603. Phase lock circuit 600 may remain in a state with switch 608 closed until a start of another charging period.

It is noted that embodiment of a phase lock circuit illustrated in FIG. 6 is merely an example. In other embodiments, different difference circuit elements, and different arrangements of circuit elements may be employed.

Figure 7:
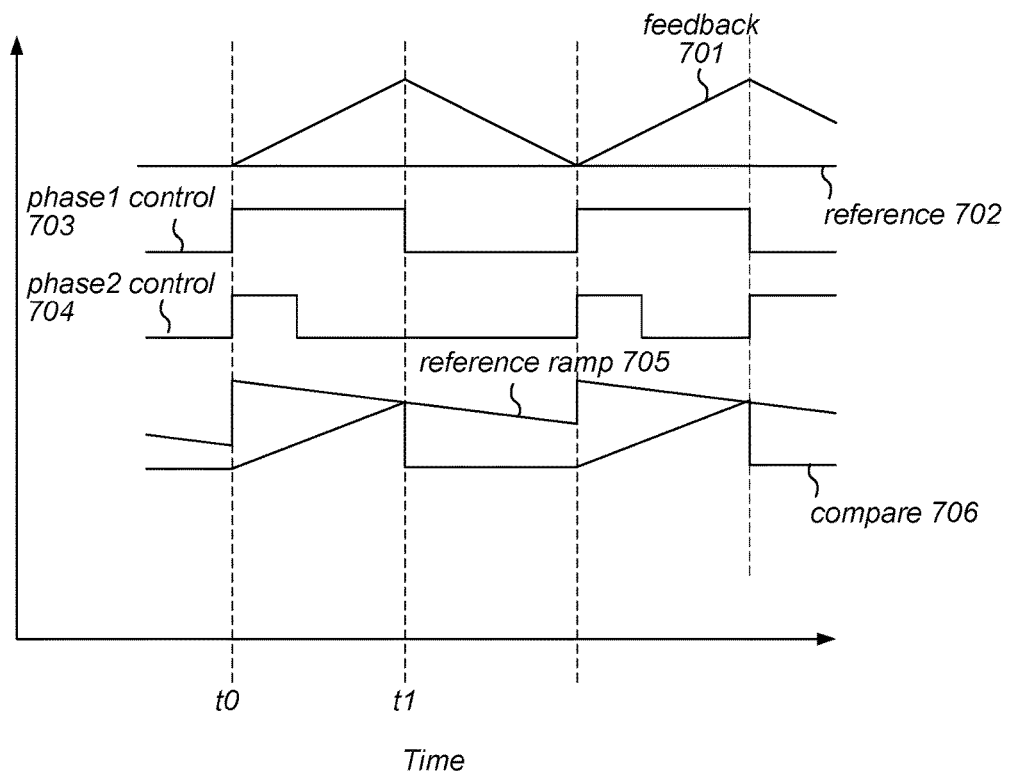
FIG. 7 illustrates sample waveforms from the operation of a regulator unit.

To further illustrate the operation of a phase unit included in a regulator that employs coupled inductors, such as, e.g., phase unit 209*a* as depicted in FIG. 2, example waveforms related to the operation of the phase unit are illustrated in FIG. 7.

At time t0, a control circuit, such as, e.g., control circuit 201*a*, determines that a voltage level of feedback 701 is less than a voltage level of reference 702. In response to such a determination, phase 1 control 703 transitions to a high logic level and low side control 704 transitions to a low logic level, signaling the beginning of a charging period. It is noted that, in various embodiments, high side control 703 may correspond to control 506 and low side control 704 may correspond to control 507, as illustrated in FIG. 5.

In response to the transitions on high side control 703 and low side control 704, a driver circuit, such as, e.g., driver 202*a*, may stop sinking current from the regulated supply, and begin sourcing current to the regulated supply, thereby resulting in an increase in the level of feedback 701.

Moreover, the transitions in high side control 703 and low side control 704, begin the charging of a sense capacitor, such as, e.g., sense capacitor 604, resulting in an increase in voltage level of sense capacitor voltage 706. In various embodiments, different current sources may be used to charge the sense capacitor. The current sources may, in some embodiments, be based on the coupling coefficient between the coupled inductors. As described above in regard to FIG. 6, phase 1 control 703 and phase 2 control 704 may operate switches that selectively couple the sense capacitor to a current source or to a ground supply. It is noted that the duty cycles of phase 1 control 703 and phase 2 control 704 are merely an example. In other embodiments, phase 1 control 703 and phase 2 control 704 may have different duty cycles.

As sense capacitor voltage 706 continues to increase in voltage, and reference ramp 706 continues to decrease in voltage, a comparator, such as, e.g., comparator 601, compare the voltage levels of the two signals. At time t1, sense capacitor voltage 706 becomes greater than reference ramp 705, signaling the end of the charging period. In response to the comparator detecting this situation, high side control 703 and low side control 704 change state, thereby causing the driver to stop sourcing current to the regulated supply, and begin sinking current from the regulated supply. As a result, feedback 701 begins to decrease in voltage. It is noted that, in some embodiments, a transition in phase 2 control 704 may result in decoupling a current source providing charge to the sense capacitor, and coupling a current source to the sense capacitor that sinks current from the sense capacitor.

Also, in response to the change in state of phase 1 control 703 and phase 2 control 704, the current being source to the sense capacitor is stopped, and the sense capacitor is discharge via a current source, resulting in a change in sense capacitor voltage 706. The phase unit may then remain in this state, with reference ramp 705 continuing to decrease in voltage, until time t2, at which point, then a new charging period beings.

It is noted that the waveforms illustrated in FIG. 7 are merely examples. In other embodiments, such waveforms may appear differently due to variations in levels of power supplies, temperature changes, variations in circuit component values, and the like.

Figure 8:
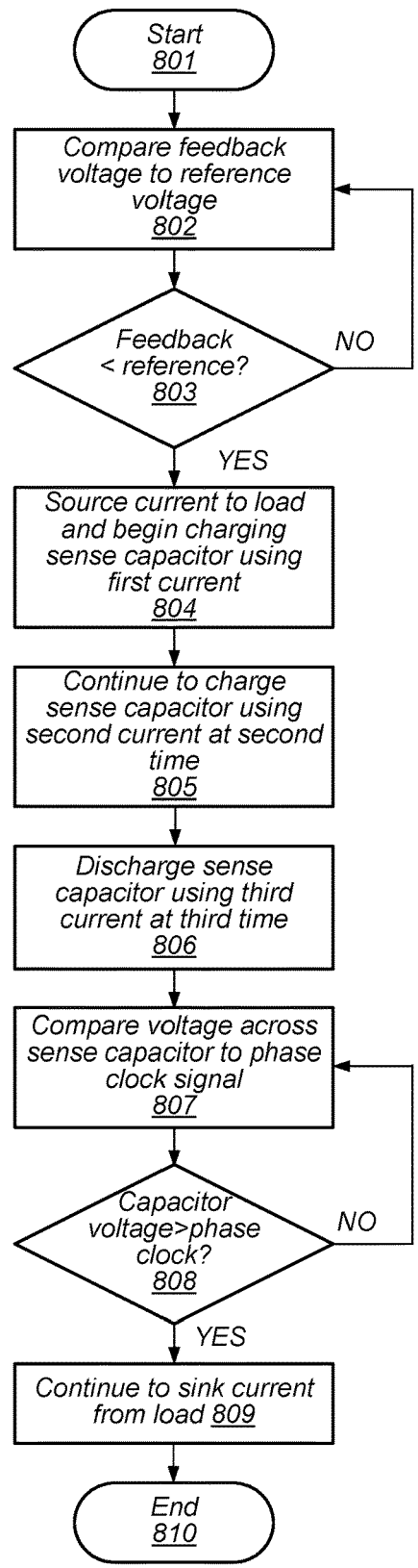
FIG. 8 depicts a flow diagram illustrating an embodiment of a method for operating a phase unit of a regulator unit that employs coupled inductors.

Turning to FIG. 8, a flow diagram depicting an embodiment of a method for operating a phase unit of a multi-phase voltage regulator with coupled inductors, such as, phase unit 208*a*, for example. The method begins in block 801.

A feedback voltage for the phase unit may then be compared to a reference voltage (block 802). In various embodiments, the feedback voltage may be generated dependent upon an output voltage of a driver circuit, such as, e.g., driver 202*a*, and may be compared to the reference voltage using a comparator, or any other suitable comparison circuit. The method may then depend on results of the comparison (block 803).

If the feedback voltage is greater than the reference voltage, the method may continue from block 802, as described above. Alternatively, if the feedback voltage is less than the reference voltage, then current may be sourced to a power supply node of a load circuit via an inductor, and charging of a sense capacitor may begin starting a charging period using a first current (block 804). In some embodiments, a driver circuit, such as, driver 202a, may couple a terminal of an inductor to a power supply via p-channel MOSFET or other suitable transconductance device. The sense capacitor may, in various embodiments, be charged using a first current whose value is based upon the output voltage of the driver circuit and the voltage level of the power supply coupled to the regulator.

The sense capacitor may then be continued to be charged using a second current starting a second time (block 805). In various embodiments, the second current may be based, at least in part, on the coupling coefficient between the coupled inductors used in the regulator. At a third time, the sense capacitor may be discharged using a third current (block 806). In some embodiments, the value of the third current may also depend on the coupling coefficient between the coupled inductors.

A voltage across the sense capacitor may then be compared to a reference voltage ramp (block 807). In various embodiments, the reference ramp voltage may be initially set to a maximum value, and the discharged to a minimum value over a period of time. The method may then depend on results of the comparison between the voltage across the sense capacitor and the reference ramp voltage (block 808).

If the voltage across the sense capacitor is less than the reference ramp voltage, then the method may proceed from block 807, as described above. Alternatively, if the voltage level across the sense capacitor is greater than the reference ramp voltage, then current is sunk from the power supply node of the load circuit, and the discharge of the sense capacitor is continued as the charging period ends (block 809). In various embodiments, a driver circuit, such as, e.g., driver 202a, may deactivate a p-channel MOSFET coupling an inductor to the power supply, and activate an n-channel MOSFET coupling the inductor terminal to ground, thereby allowing current to flow from the power supply node of the load circuit into ground.

The current source charging the sense capacitor may be disconnected from the sense capacitor by opening a switch or other suitable device, and the sense capacitor may be coupled to a ground supply using another switch or another suitable device. The method may then conclude in block 810.

Although the operations included in the flow diagram of FIG. 8 are depicted as being performed in a sequential fashion, in other embodiments, one or more of the operations may be performed in parallel.

Figure 9:
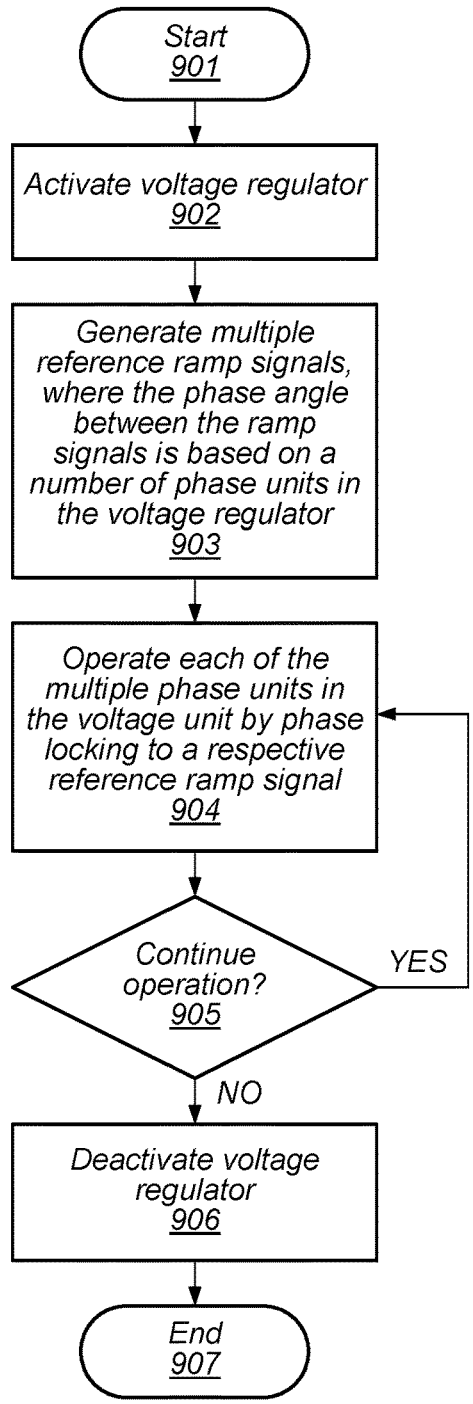
FIG. 9 depicts a flow diagram illustrating an embodiment of a method for operating a regulator unit.

Turning to FIG. 9, a flow diagram depicting an embodiment of a method for operating a voltage regulator is illustrated. Referring collectively to the embodiment of FIG. 2, and the flow diagram of FIG. 9, the method begins in block 901. Regulator unit 200 may then be activated (block 902). In various embodiments, the activation of regulator unit 200 may be in response to activating a particular circuit block, such as, e.g., circuit block 102a as shown in FIG. 1, included in an SoC, or other integrated circuit.

Multiple reference ramp signals may then be generated (block 903). Each reference ramp signal may be out of phase with the other reference ramp signals. In some embodiments, a phase angle between each of the reference ramp signals may be dependent upon a number of phase units included in a regulator unit. For example, in the embodiment illustrated in FIG. 2, there are three phase units and three reference ramps signals, with a 120-degree phase shift between each reference ramp signal.

Each phase unit of the multiple phase units in the regulator unit may then be operated (block 904). In some embodiments, the operations described in the flow diagram of FIG. 8 may be included as part of block 904. During operation, the operation of a given phase unit may include phase locking the charging period of the given phase unit to a respective ramp signal. As described above, switch control signals from one phase unit may be used in another phase unit in order to determine a duration of the charging period.

In various embodiments, each reference ramp signal is separated by a phase angle based on a number of phase units included in the regulator unit, so the charging periods of each phase unit may also be separated by the phase angle. For regulators employing two coupled inductors, the reference ramp signals may be separate by a 180-degree phase angle. It is noted that, in some cases, variations in component values of circuit elements included in the phase units may result in different values, and phase relationships, between the charging periods of the phase units included in the regulator unit. The method may then depend on whether the regulation operation is to continue (block 905).

If the regulation operation is to continue, then the method may continue from block 904, as described above, to continue operating the multiple phase units of regulation unit 200. Alternatively, if the regulation operation is no longer needed, the regulated may be deactivated (block 906). In various embodiments, each of reference ramps 207a-c, may be held in an off-state, and bias currents, such, e.g., bias current 605 may be disabled. With the deactivation of regulator unit 200, the method may conclude in block 907.

It is noted that the embodiment of the method depicted in the flow diagram of FIG. 9 is merely an example. In other embodiments, different operations and different orders of operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a first inductor coupled to a power supply node included in a load circuit;
a second inductor coupled to the power supply node and inductively coupled to the first inductor;
a driver circuit coupled to the first and second inductors, wherein the driver circuit is configured to charge the power supply node for a first charging period via the first inductor and charge the power supply node for a second charging period via the second inductor; and
a control circuit configured to:

charge a first capacitor using a first current of a first plurality of currents;

charge, after a time period has elapsed since a beginning of charging the first capacitor with the first current, the first capacitor using a second current of the first plurality of currents, wherein the second current is based on a coupling coefficient indicative of an amount of coupling between the first inductor and the second inductor;

determine a first duration of the first charging period using results of a comparison between a first voltage level across the first capacitor and first reference voltage ramp; and determine a second duration of the second charging period using a second plurality of currents.

2. The apparatus of claim 1, wherein the driver circuit is further configured to:

discharge the power supply node via the first inductor in response to a determination that the first charging period has ended; and discharge the power supply node via the second inductor in response to a determination that the second charging period has ended.

3. The apparatus of claim 1, wherein to determine the second duration of the second charging period, the control circuit is further configured to:

charge a second capacitor using a third current of the second plurality of currents;

charge the second capacitor using a fourth current of the second plurality of currents, wherein the fourth current is based on the coupling coefficient; and compare a second voltage level across the second capacitor to a second reference ramp voltage.

4. The apparatus of claim 3, wherein the control circuit is further configured to:

discharge the first capacitor using a fifth current of the first plurality of currents; and discharge the second capacitor using a sixth current of the second plurality of currents.

5. The apparatus of claim 3, wherein the second reference ramp voltage is phase shifted from the first reference voltage ramp by a 180-degree phase angle.

6. A method, comprising:

charging, for a first charging period, a power supply node included in a load circuit via a first inductor coupled to the power supply node and based on a comparison of a voltage level at a first terminal of the first inductor and a reference voltage;

charging, for a second charging period, the power supply node via a second inductor and based on a comparison of a voltage level at a second terminal of the second inductor and the reference voltage, wherein the second inductor is inductively coupled to the first inductor;

charging a first capacitor using a first current of a first plurality of currents; and charging, after a time period has elapsed since a beginning of charging the first capacitor with the first current, the first capacitor using a second current of the first plurality of currents, wherein the second current is based upon a coupling coefficient indicative of an amount of coupling between the first inductor and the second inductor;

determining a first duration of the first charging period using results of comparing a first voltage level across the first capacitor to a first reference voltage ramp;

determining a second duration of the second charging period using a second plurality of currents;

discharging the power supply node via the first inductor in response to determining that the first charging period has ended; and discharging the power supply node via the second inductor in response to determining that the second charging period has ended.

7. The method of claim 6, wherein determining the second duration of the second charging period includes:

charging a second capacitor using a third current of the second plurality of currents; and charging the second capacitor using a fourth current of the second plurality of currents, wherein the fourth current is based upon the coupling coefficient; and comparing a second voltage level across the second capacitor to a second reference voltage ramp.

8. The method of claim 7, further comprising:

discharging the first capacitor using a fifth current of the first plurality of currents; and discharging the second capacitor using a sixth current of the second plurality of currents.

9. The method of claim 7, wherein the second reference voltage ramp is phase shifted from the first reference voltage ramp by a 180-degree phase angle.

10. The method of claim 6, wherein the first reference voltage ramp includes an increasing voltage level for a first period of time, and a decreasing voltage level for a second period of time.

11. The method of claim 10, wherein the second period of time is greater than the first period of time.

12. A system, comprising:

a plurality of circuit blocks;

a first inductor coupled to a power supply node of a particular circuit block of the plurality of circuit blocks;

a second inductor coupled to the power supply node of the particular circuit block, wherein the second inductor is inductively coupled to the first inductor;

a regulator circuit configured to:

charge, for a first charging period, the power supply node via the first inductor and based on a comparison of a voltage level at a first terminal of the first inductor and a reference voltage;

charge, for a second charging period, the power supply node via the second inductor based on a comparison of a voltage level at a second terminal of the second inductor and the reference voltage;

charge a first capacitor using a first current of a first plurality of currents; and charge, after a time period has elapsed since a beginning of charging the first capacitor with the first current, the first capacitor using a second current of the first plurality of currents, wherein the second current is based upon a coupling coefficient indicative of an amount of coupling between the first inductor and the second inductor;

determine a first duration of the first charging period using results of a comparison between a first voltage level across the first capacitor and first reference ramp voltage;

determine a second duration of the second charging period using a second plurality of currents;

discharge the power supply node via the first inductor in response to a determination that the first charging period has ended; and discharge the power supply node via the second inductor in response to determination that the second charging period has ended.

13. The system of claim 12, wherein to determine the second duration of the second charging period, the regulator circuit is further configured to:
- charge a second capacitor using a third current of the second plurality of currents; and
- charge the second capacitor using a fourth current of the second plurality of currents, wherein the fourth current is based upon the coupling coefficient; and
- compare a second voltage level across the second capacitor to a second reference voltage ramp.

14. The system of claim 13, wherein the regulator circuit is further configured to:
- discharge the first capacitor in response to a determination that the first charging period has ended; and
- discharge the second capacitor in response to a determination that the second charging period has ended.

15. The system of claim 13, wherein the second reference voltage ramp is phase shifted from the first reference ramp voltage by a 180-degree phase angle.

16. The system of claim 12, wherein the first reference ramp voltage includes an increasing voltage level for a first period of time, and a decreasing voltage level for a second period of time.

17. The system of claim 16, wherein the second period of time is greater than the first period of time.

\* \* \* \* \*